US008055874B2

(12) United States Patent  (10) Patent No.: US 8,055,874 B2
Kim  (45) Date of Patent: Nov. 8, 2011

(54) SYSTEM AND METHOD FOR PROVIDING APPLICATION PROGRAM INTERFACE PROGRAM FOR MOBILE TERMINAL

(75) Inventor: Young Hyun Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 973 days.

(21) Appl. No.: 11/951,744

(22) Filed: Dec. 6, 2007

(65) Prior Publication Data

US 2008/0140981 A1  Jun. 12, 2008

(30) Foreign Application Priority Data

Dec. 6, 2006  (KR) ........................ 10-2006-0122694

(51) Int. Cl.
*G06F 12/02*  (2006.01)

(52) U.S. Cl. ................. 711/171; 711/170; 711/E12.002

(58) Field of Classification Search .......... 711/170–171, 711/E12.002
See application file for complete search history.

(56) References Cited

U.S. PATENT DOCUMENTS 7,565,506 B2 *  7/2009  Chen et al. .................... 711/170

\* cited by examiner

*Primary Examiner* — Jasmine Song
(74) *Attorney, Agent, or Firm* — The Farrell Law Firm, P.C.

(57) ABSTRACT

Provided are a system and method for providing an Application Program Interface (API) program of a mobile terminal. A system for providing an API program of a mobile terminal to a program terminal includes: a program terminal for building a memory according to information about a memory size allocated by a mobile terminal and receiving an API program having a size corresponding to the memory size; and a mobile terminal for allocating a memory in response to a request of the program terminal, copying the API program to the memory according to the information about the allocated memory size, and transmitting the copied API program to the program terminal.

18 Claims, 3 Drawing Sheets

SYSTEM AND METHOD FOR PROVIDING APPLICATION PROGRAM INTERFACE PROGRAM FOR MOBILE TERMINAL

PRIORITY

This application claims priority under 35 U.S.C. §119(a) to a Korean Patent Application entitled "SYSTEM AND METHOD FOR PROVIDING APPLICATION PROGRAM INTERFACE PROGRAM FOR MOBILE TERMINAL" filed in the Korean Intellectual Property Office on Dec. 6, 2006 and assigned Serial No. 2006-0122694, the contents of which are incorporated herein by reference.

BACKGROUND OF THE INVENTION

1. Field of the Invention

The present invention relates to a system and method for providing an Application Program Interface (API) program for a mobile terminal to a program terminal, and more particularly, to a system and method for providing an API program for a mobile terminal to a program terminal with embedded dynamic applications.

2. Description of the Related Art

Due to recent development of technologies, including User Interface (UI) customization development kits that allow an application developer to easily replace applications in a menu screen of a mobile terminal, the use of applications and platforms using Binary Runtime Environment for Wireless Application Program Interface (BREW API) is increasing.

When a BREW API basically provided for a mobile terminal is used, a UI preconfigured for the mobile terminal is different from that of application embedded to the mobile terminal.

For example, if a same image as for a UI of a mobile terminal is created using an application, because the mobile terminal already has a module containing the image, the application needs to create a module containing the same image as that of the UI of the mobile terminal in order to apply the conforming image to the mobile terminal. A typical method for achieving uniformity in visual appearance between the application and the mobile terminal includes creation of the same image as the UI of the BREW API using the application and uploading the image to a memory of the mobile terminal.

Thus, if a module performing a same function as a BREW API module built into a mobile terminal is used by applications, application developers need to separately create modules performing the same functions as modules developed by mobile terminal manufacturers. That is, the application developers must spend time in creating modules performing the same functions as modules for mobile terminals, thus resulting in a waste of time and physical memory space.

SUMMARY OF THE INVENTION

In order to solve the above problems, the present invention provides a system and method for providing an Application Program Interface (API) program of a mobile terminal to a dynamic application that enable sharing of the API program and of resources possessed by the mobile terminal.

The present invention further provides a system and method for providing an API program of a mobile terminal to a dynamic application that can reduce an amount of time required to develop modules performing same functions as modules of the mobile terminal.

The present invention further provides a system and method for providing an API program of a mobile terminal to a dynamic application that can reduce a waste of physical memory space caused by development of modules performing same functions as modules of the mobile terminal.

In accordance with an exemplary embodiment of the present invention, a system for providing an API program of a mobile terminal to a program terminal includes a program terminal for building a memory according to information about a memory size allocated by a mobile terminal and receiving an API program having a size corresponding to the memory size; and a mobile terminal for allocating a memory in response to a request of the program terminal, copying the API program to the memory according to the information about the allocated memory size, and transmitting a copied API program to the program terminal.

In accordance with another exemplary embodiment of the present invention, a method for providing an API program of a mobile terminal to a program terminal includes connecting the program terminal to the mobile terminal; allocating, by the mobile terminal, a memory of the mobile terminal in response to a request of the program terminal and transmitting information about a size of allocated memory to the program terminal; building, by the program terminal, a memory according to the information about the allocated memory size; transmitting information about a size of a built memory to the mobile terminal, and requesting the API program of the mobile terminal; and copying, by the mobile terminal, a requested API program to the memory of the mobile terminal according to the information about the built memory size and transmitting a copied API program to the program terminal.

In accordance with another exemplary embodiment of the present invention, a method for receiving an API program of a mobile terminal on a program terminal includes connecting to the mobile terminal; requesting, by the program terminal, the mobile terminal to send information about a memory size necessary to receive the API program of the mobile terminal; building, upon receiving a requested information about the memory size, a memory according to the information about a received memory size; and transmitting information about the size of the built memory to the mobile terminal, requesting the API program of the mobile terminal, and receiving the API program from the mobile terminal.

In accordance with another exemplary embodiment of the present invention, a method for providing an API program of a mobile terminal to a program terminal includes
connecting to the program terminal; allocating, in response to a request for allocation of a memory from the program terminal, a memory having a size corresponding to information about a necessary memory size and transmitting information about a size of an allocated memory to the program terminal; receiving information about a memory size and a request for API program from the program terminal; and copying the API program to the memory according to the information about the allocated memory size and transmitting the copied API program to the program terminal.

BRIEF DESCRIPTION OF THE DRAWINGS

The objects, features, and advantages of the present invention will be more apparent from the following detailed description in conjunction with the accompanying drawings, in which.

DETAILED DESCRIPTION OF EXEMPLARY EMBODIMENTS

Hereinafter, exemplary embodiments of the present invention are described in detail with reference to the accompanying drawings.

Detailed descriptions of well-known functions and structures incorporated herein may be omitted to avoid obscuring the subject matter of the present invention.

In the exemplary embodiments described, a program terminal refers to a terminal with embedded dynamic applications. The program terminal may be a server or Personal Computer (PC) embedded with a dynamic application. A mobile terminal may have a Binary Runtime Environment for Wireless Application Program Interface (BREW API). Further, although it is described herein that an API program of a mobile terminal is provided to a program terminal, resources for the mobile terminal can also be provided to a program terminal if this does not undermine security.

The BREW API may include program codes containing the following header files:
define CFGI_PROVISION_FIRST
define CFGI_PROVISION_LAST
define CFGI_MAX
define CFGI_FIRST_OEM
define CFGI_SECOND_OEM The "#define CFGI_PROVISION_FIRST", "#define CFGI_PROVISION_LAST", and "#define CFGI_MAX" header files may be default header files provided to the mobile terminal. The "#define CFGI_FIRST_OEM" and "#define CFGI_SECOND_OEM" header files may be header files containing information about program codes provided by a mobile terminal manufacturer such as a code for an image and a code for memory allocation.

A function defined in a header file provided by the mobile terminal manufacturer, and a program code contained in the function are as follows.

```
{
    case CFGI_FIRST_OEM:
        if(nSize != sizeof(int))
            return EBADPARM;
        return GetAPIsize((int *)pBuff);
        break;
    case CFGI_SECOND_OEM:
        if(nSize != sizeof(void))
            return EBADPARM;
        return GetAPI((void *)pBuff);
        break;
}
```

When the program terminal calls a function "CFGI_FIRST_OEM" in a mobile terminal, the function "CFGI_FIRST_OEM" transmits an API program or resources of the mobile terminal to the program terminal.

A function "CFGI_SECOND_OEM" of the mobile terminal may transmit an API program or resources requested by the program terminal to the program terminal. Further, the mobile terminal manufacturer can modify a program code of the mobile terminal to access functions constituting an API program to be provided by the mobile terminal using class IDs. For example, the mobile terminal manufacturer may modify the program code in such a manner as to expand an existing API program or register a new API program.

Figure 1:
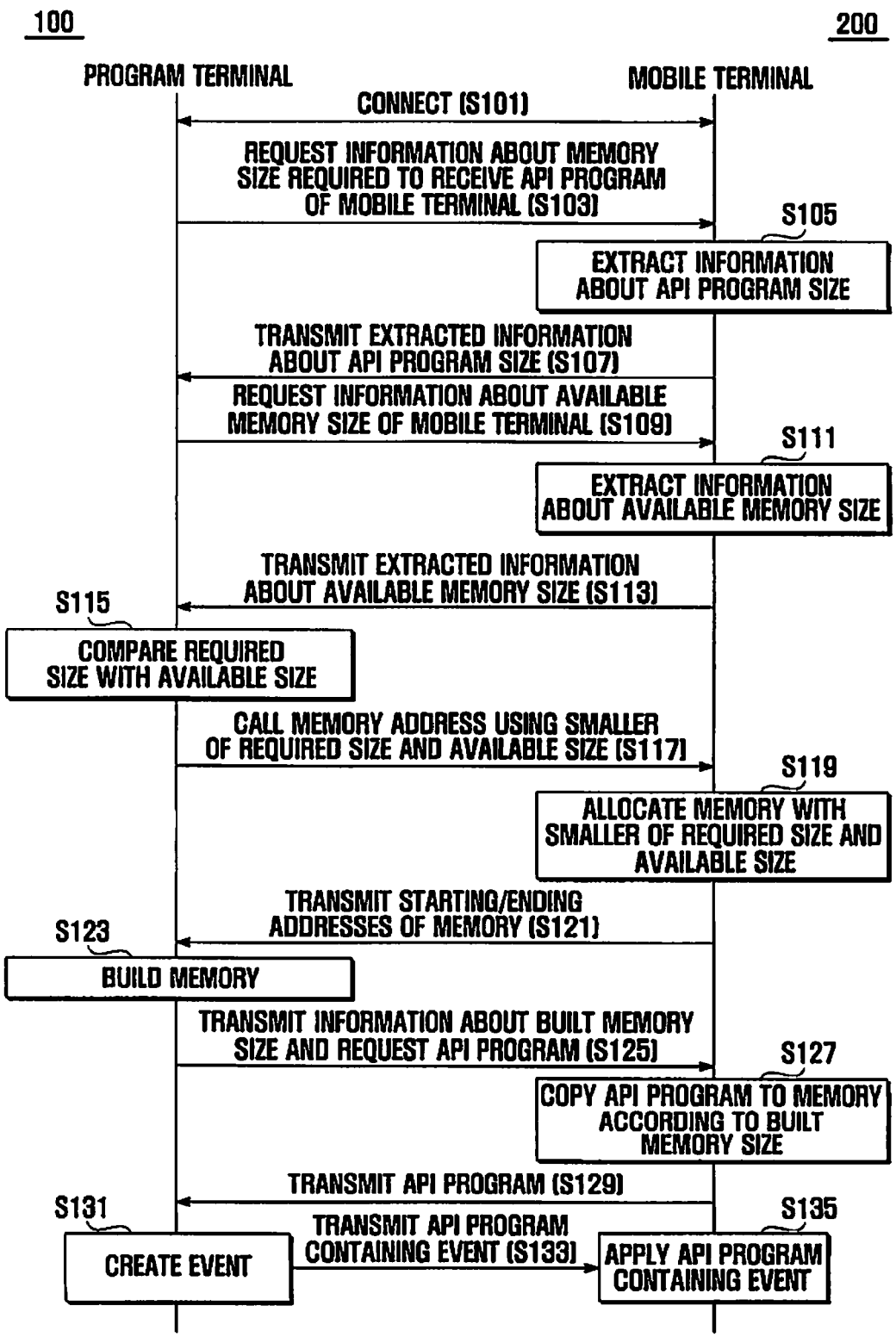
FIG. 1 is a flow diagram illustrating a method for providing an API program for a mobile terminal to a program terminal according to an exemplary embodiment of the present invention.

FIG. 1 is a flow diagram illustrating a method for providing an Application Program Interface (API) program of a mobile terminal to a program terminal according to an exemplary embodiment of the present invention.

Referring to FIG. 1, if a program terminal 100 is connected to a mobile terminal 200, in step S101, for example via a Universal Serial Bus (USB) cable, the program terminal 100 requests information about a memory size necessary to receive an API program of the mobile terminal 200 from the mobile terminal 200, in step S103 in order to allocate the memory size required to receive the API program. The mobile terminal 200 then extracts the information about the size of the API program in response to the request, in step S105, and transmits the extracted information to the program terminal 100, in step S107.

The program terminal 100 requests information about a memory size, available in the mobile terminal 200 (hereinafter, "available memory size") from the mobile terminal 200, in step S109. It is possible to receive the API program of the mobile terminal 200 even in the case of making only the request for the information about the size of API program. However, according to the present exemplary embodiment, the program terminal 200 redundantly requests information about the API size and available memory size in order to reduce a transmission error that may be caused by insufficient memory capacity in the mobile terminal 200 when an API program containing events created by the program terminal 100 is sent from the program terminal 100 to the mobile terminal 200.

The mobile terminal 200 extracts information about the available memory size in response to the request made at step S109 and transmits the extracted information to the program terminal 100, in step S113.

The program terminal 100 compares the information about API program size received from the mobile terminal 200 at step S107 with the information about available memory size received at step S113, in step S115, and requests an address of a memory to be allocated using a smaller of the API program size and the available memory size from the mobile terminal 200, in step S117.

The mobile terminal 200 allocates a memory having the smaller of the API program size and the available memory size in response to a received request for the memory address, in step S119. Thereafter, the mobile terminal 200 transmits a starting address and ending address of an allocated memory, in step S121. The program terminal 100 builds a memory by using a received starting address and ending address, in step S123.

The program terminal 100 then transmits information about the size of the built memory to the mobile terminal 200 and requests the API program, in step S125. The requested API program may be a function selected for use by the program terminal 100 among functions comprised in the API program of the mobile terminal 200. The mobile terminal 200 copies the API program to the memory according to the received built memory size information, in step S127. Here, if the mobile terminal 200 determines that built memory size of the program terminal 100 is smaller than the API program size, the mobile terminal 200 may divide the API program to a size smaller than or equal to the size of the built memory of the program terminal 100 and copy the divided API program to the memory of the mobile terminal 200. When dividing the API program, information required for creating an event (for example, function, code, and data) is extracted.

The mobile terminal 200 transmits the copied API program to the program terminal 100 and deletes the copied API program to secure sufficient memory capacity, in step S129

Thereafter, the program terminal 100 creates an event within the received API program, in step S131, and transmits the API program containing the created event to the mobile terminal 200, in step S133.

The mobile terminal 200 applies the received API program, in step S135. The event created within the API program may be an application such as a game.

Further, if the API program transmitted to the program terminal 100 at step S129 includes the same functions as the API program containing the created event transmitted at step S133, the mobile terminal 200 can apply the API program received at step S133 by converting functions of the API program of the mobile terminal 200 into the functions in the received API program.

Figure 2:
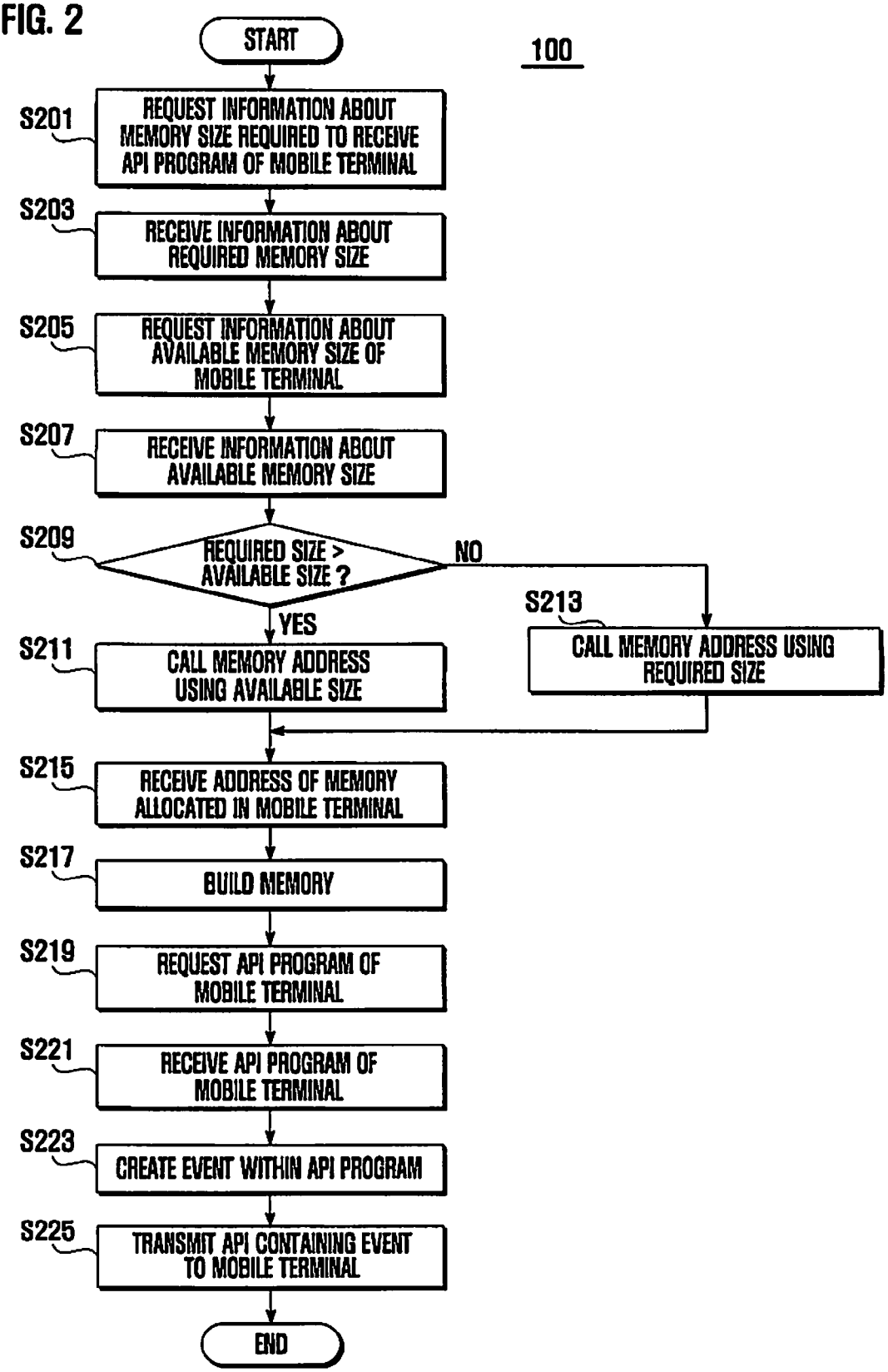
FIG. 2 is a flowchart illustrating a method for receiving an API program for a mobile terminal on a program terminal according to another exemplary embodiment of the present invention.

FIG. 2 is a flowchart illustrating a method for receiving an API program of the mobile terminal 200 in program terminal 100 according to another exemplary embodiment of the present invention.

Referring to FIG. 2, after being connected to the mobile terminal 200 via a USB cable, the program terminal 100 requests information about a memory size (i.e., the size of an API program) necessary to receive an API program of the mobile terminal 200 from the mobile terminal 200 in order to allocate the required memory size, in step S201. The program terminal 100 then receives requested information about the size of the API program from the mobile terminal 200, in step S203.

The program terminal 100 requests information about available memory size in the mobile terminal 200 from the mobile terminal 200, in step S205. The program terminal 100 receives information about a memory size available in the mobile terminal 200 from the mobile terminal 200 as a response to the request, in step S207.

The program terminal 100 compares the required memory size received at step S203 with the available memory size received at step S207, and determines whether the required memory size is greater than the available memory size of the mobile terminal 200, in step S209.

If the required memory size is greater than the available memory size, the program terminal 100 requests the mobile terminal 200 to send an address allocated by the mobile terminal 200 of a memory having a size equal to that of the available memory, in step S211. If the required memory size is not greater than the available memory size, the program terminal 100 requests the mobile terminal 200 to send an address allocated by the mobile terminal 200 of a memory having a size equal to that of the required memory, in step S213.

Thereafter, the program terminal 100 receives the address allocated by the mobile terminal 200 of a memory having the requested size from the mobile terminal 200, in step S215, and builds a memory using the address of the allocated memory, in step S217. The address of the memory may be starting address and ending address of the memory allocated in the mobile terminal 200.

The program terminal 100 transmits information about a size of the memory built at step S217 to the mobile terminal 200 and requests an API program from the mobile terminal 200, in step S219. The program terminal 100 may request the API program by selecting a desired function and resource among various functions in the API program and resources of the mobile terminal 200. More specifically, the program terminal 100 creates the address of the memory, the information about the memory size, and the requested API program as parameters, and transmits parameters as a string. For example, a string representing the requested API program may be "int OEM_OPEN_Extension(IShell* pIshell, AEE-CLSID cis, . . . )". The program terminal 100 requests additional information required for expanding the API program of the mobile terminal 200.

The program terminal 100 receives the requested API program from the mobile terminal 200, in step S221, and creates an event within the API program, in step S223. For example, the event may be an application such as a game. The program terminal 100 then transmits an API program containing the created event to the mobile terminal 200, in step S225.

Figure 3:
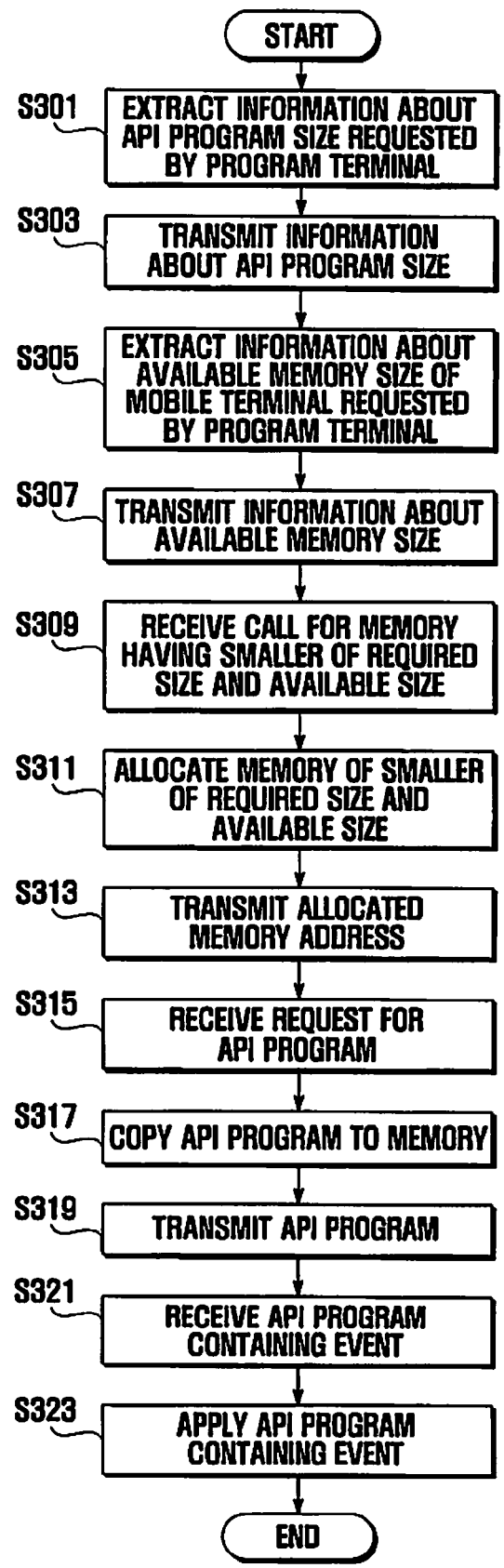
FIG. 3 is a flowchart illustrating a method for providing an API program for a mobile terminal to a program terminal according to another exemplary embodiment of the present invention.

FIG. 3 is a flowchart illustrating a method for providing an API program of the mobile terminal 200 to the program terminal 100 according to another exemplary embodiment of the present invention.

Referring to FIG. 3, after being connected to the program terminal 100 via a USB cable, the mobile terminal 200 extracts information about a size of an API program requested by the program terminal 100, in step S301, and transmits information about the extracted API program size to the program terminal 100, in step S303. The mobile terminal 200 extracts information about a size of available memory in the mobile terminal 200 requested by the program terminal 100, in step S305, and transmits the extracted information about available memory size to the program terminal 100, in step S307.

The mobile terminal 200 then receives a call for a memory having a smaller of the extracted API program size and the available memory size from the program terminal 100, in step S309, and allocates a memory having the smaller of the extracted API program size and the available memory size, in step S311. The mobile terminal 200 transmits an address of the allocated memory to the program terminal 100, in step S313. An address of the memory may be starting address and ending address of the allocated memory.

Thereafter, the mobile terminal 200 receives information about a size of a memory built in the program terminal 100 and a request for an API program from the program terminal 100, in step S315. The mobile terminal 200 copies the API program to the memory according to the received built memory size information, in step S317. The mobile terminal 200 then transmits a copied API program to the program terminal 100 and deletes the copied API program from the memory to provide sufficient free memory space for other allocation requests, in step S319. More specifically, at step S315, the mobile terminal 200 receives the address of the memory, memory size and requested API program represented as a string from the program terminal 100. For example, a string representing the requested API may be "int OEM_OPEN_Extension(IShell* pIshell, AEECLSID cis, . . . )". The mobile terminal 200 copies the API program to the allocated memory of the mobile terminal 200 in response to receiving the "AEECLSID cis" and subsequently added information to the mobile terminal 200, and transmits the copied API program to the program terminal 100.

The mobile terminal 200 receives an API program containing a created event from the program terminal 100, in step S321, and applies the received API program, in step S323. For example, if the event is an application such as a game created by the program terminal 100, the mobile terminal 200 may receive the API program to execute the application. If the API program transmitted to the program terminal 100 at step S319 includes the same functions as the API program received from the mobile terminal 200 at step S321, the mobile terminal 200 can apply the API program by converting the API functions of the mobile terminal 200 into the functions in the received API program.

As described above, a system and method for providing an API program and resources possessed by a mobile terminal to a dynamic application can reduce the amount of time required for a mobile terminal developer and an application developer to create modules performing the same functions.

The present invention also provides a system and method for providing an API program of a mobile terminal to a dynamic application that can reduce a waste of physical memory space caused by development of modules performing same functions by enabling sharing of an API program and resources of the mobile terminal with the dynamic application.

The present invention also enables the dynamic application to check the size of an API program and available memory size of the mobile terminal, thus reducing waste of physical memory space within the dynamic application. While the present invention has been particularly shown and described with reference to exemplary embodiments thereof, the description of the exemplary embodiments is to be construed as exemplary only and does not describe every possible instance of the invention. Therefore, it should be understood that various changes may be made and equivalents may be substituted for elements of the invention without departing from the spirit and scope of the present invention as defined by the following claims.

What is claimed is:

1. A system for providing an Application Program Interface (API) program of a mobile terminal to a program terminal, the system comprising:
   the program terminal for building a memory according to information about a memory size allocated by the mobile terminal and receiving the API program having a size corresponding to the memory size; and
   the mobile terminal for allocating memory in response to a request of the program terminal, copying the API program to the memory according to the information about the allocated memory size, and transmitting the copied API program to the program terminal,
   wherein the mobile terminal transmits a starting address and an ending address of the allocated memory to the program terminal.

2. The system of claim 1, wherein the program terminal requests information about a necessary memory size to receive the API program of the mobile terminal and an information about available memory size.

3. The system of claim 2, wherein the information about the necessary memory size is information about a size of the API program for determining a memory size necessary to receive the API program.

4. The system of claim 2, wherein the program terminal receives information about the necessary memory size and information about the available memory size from the mobile terminal and compares the necessary memory size information with the available memory size information, and requests allocation of a memory having a smaller of the necessary memory size and the available memory size.

5. The system of claim 4, wherein the program terminal receives the starting address and the ending address from the mobile terminal, builds the memory using the starting and ending addresses, transmits information about a size of the built memory to the mobile terminal, and requests the API program of the mobile terminal.

6. The system of claim 2, wherein the mobile terminal extracts information about a memory size of the API program and information about the available memory size of the mobile terminal in response to the request of the program terminal.

7. The system of claim 1, wherein the program terminal creates an event within the received API program and transmits an API program containing the created event to the mobile terminal.

8. The system of claim 7, wherein the mobile terminal applies the API program containing the event received from the program terminal.

9. A method for providing an Application Program Interface (API) program of a mobile terminal to a program terminal, the method comprising:
   connecting the program terminal to the mobile terminal;
   allocating, by the mobile terminal, a memory of the mobile terminal in response to a request of the program terminal and transmitting information about a size of the allocated memory to the program terminal, the information about the allocated memory size comprising a starting address and an ending address of the allocated memory;
   building, by the program terminal, a memory according to the information about the allocated memory size, transmitting information about a size of the built memory to the mobile terminal, and requesting the API program of the mobile terminal; and
   copying, by the mobile terminal, the requested API program to the memory of the mobile terminal corresponding to the information about the built memory size and transmitting a copied API program to the program terminal.

10. The method of claim 9, further comprising:
    creating, by the program terminal, an event within the API program received from the mobile terminal;
    transmitting an API program containing the created event to the mobile terminal; and
    applying the API program containing the event to the mobile terminal.

11. The method of claim 9, wherein allocating a memory and transmitting information about the size of the allocated memory to the program terminal comprises:
    requesting, by the program terminal, information about a necessary memory size to receive the API program of the mobile terminal; and
    allocating, by the mobile terminal, a memory in response to the request of the program terminal and transmitting the starting and ending addresses of the allocated memory to the program terminal.

12. A method for receiving an Application Program Interface (API) program of a mobile terminal on a program terminal, the method comprising:
    connecting to the mobile terminal;
    requesting, by the program terminal, the mobile terminal to send information about a necessary memory size to receive the API program of the mobile terminal;
    building, upon receiving the requested information about the memory size, a memory according to the received information about the memory size, the received information comprising a starting address and an ending address of the memory; and transmitting information about a size of the built memory to the mobile terminal, requesting the API program of the mobile terminal, and receiving the API program from the mobile terminal.

13. The method of claim 12, further comprising creating an event in the received API program and transmitting an API program containing the event to the mobile terminal.

14. The method of claim 12, wherein requesting the mobile terminal to send information about a memory size comprises:
   requesting information about a necessary memory size to receive the API program of the mobile terminal;
   receiving the information about the necessary memory size from the mobile terminal;
   requesting information about an available memory size of the mobile terminal;
   receiving the information about the available memory size from the mobile terminal;
   comparing the information about the necessary memory size with the information about the available memory size; and
   requesting an address of a memory having a smaller of the necessary memory size and the available memory size.

15. The method of claim 12, wherein building a memory according to the received information about the memory size comprises:
   receiving the starting address and the ending address from the mobile terminal; and
   building the memory using the starting and ending addresses.

16. A method for providing an Application Program Interface (API) program of a mobile terminal to a program terminal, the method comprising:
   connecting to the program terminal;
   allocating, in response to a request for allocation of a memory from the program terminal, a memory having a size corresponding to information about the requested memory size and transmitting information about the size of the allocated memory to the program terminal, the information comprising a starting address and an ending address of the allocated memory;
   receiving information about a memory size and a request for the API program from the program terminal; and
   copying the API program to the memory according to the information about the allocated memory size and transmitting the copied API program to the program terminal.

17. The method of claim 16, further comprising:
   receiving an API program containing a created event from the program terminal; and
   applying the received API program.

18. The method of claim 17, wherein allocating a memory and transmitting information about the allocated memory size to the program terminal comprises:
   extracting, upon request from the program terminal, information about a size of the API program and transmitting the extracted information to the program terminal;
   extracting, upon request from the program terminal, information about an available memory size and transmitting the extracted information to the program terminal;
   receiving a request for information about a memory having a smaller of the API program size and the available memory size from the program terminal; and
   allocating a memory corresponding to the information about the memory having the smaller size in response to the request and transmitting the starting address and the ending address of the allocated memory.

\* \* \* \* \*